Patented Apr. 13, 1943

2,316,636

UNITED STATES PATENT OFFICE 2,316,636

POLYCARBOXYLIC ACIDS

Wilber O. Teeters, Roselle, Del., assignor to E. I. du Pont de Nemours & Company, Wilmington, Del., a corporation of Delaware No Drawing. Application July 13, 1940,
Serial No. 345,418

1 Claim. (Cl. 260—534)

This invention relates to a process for the preparation of polycarboxylic acids and more specifically to the preparation of amino polycarboxylic acids and their salts from the alcohol amines.

The compounds are obtained by the interaction of one mole of an alcohol amine in an alkaline solution with from 3 to 3.5 moles of a monohalogenated carboxylic acid, (or alternatively by the interaction of the amine with an alkali metal salt of the acid), at temperatures between 20 and 100° C. and under normal pressures, although pressures above or below atmospheric may be used if desired, the free acid being liberated from the salt produced by acidifying the solution. Examples of alcohol amines which may be converted to polycarboxylic acids in accord with the process of the present invention are ethanol amine, diethanol amine, propanol amine, dipropanol amine, butanol amine, and the higher straight and branched chain mono and dialcohol amines.

These alcohol amines may be reacted with the halogenated carboxylic acids generally, but more particularly the mono α halogenated fatty acids such as mono α chloracetic acid, mono α chlorpropionic acid, mono α chlorbutyric acid, and the like.

By this process compounds having the following empirical formula are obtained:

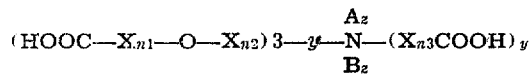

in which X designates the radical

(in which the R groups are hydrogen or hydrocarbons) $n_{1-3}$ are integers, $y$ is an integer not greater than 2, A is a hydrocarbon or the group

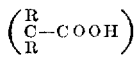

B is an ion such as, for example, chlorine, fluorine, bromine, and sulfate ions, $z$ is a numeral not greater than 1 and where $z$ is 0, A and B drop out of the formula. Thus, for example, from ethanol amine is produced,

from diethanol amine,

and from dipropanol amine,

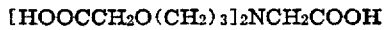

and from ethanol amine with an excess of sodium chloracetate,

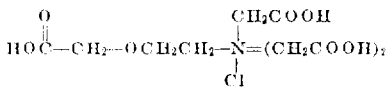

The following examples will illustrate specific embodiments of the invention without limiting it to the details shown. The parts given are by weight.

*Example 1.*—Preparation of a salt having the empirical formula,

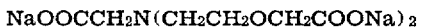

To a solution of 39 parts of sodium chloracetate in 56 parts of water are added 11.6 g. of diethanol amine and 21 parts of monohydrated sodium carbonate. The mixture is let stand 4 hours at room temperature and then heated for 7 hours at 85 to 95° C. The cooled reaction mixture is freed of a small amount of sodium bicarbonate by filtration. The clear filtrate contains the sodium salt of the triacetic acid derivative of diethanol amine. This solution may be used directly as a water-treating agent for the purposes described below and when so used, and especially when used as a lime sequestering agent and water softener, it should be employed in sufficient amounts to prevent undesirable precipitation.

If desired the clear filtrate may be acidified with a strong acid such as hydrochloric acid to liberate the free acid in aqueous solution.

*Example 2.*—Preparation of a salt having the empirical formula,

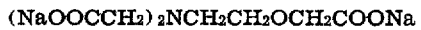

To a solution of 39 parts of sodium chloracetate in 56 parts of water are added 6.77 parts of ethanol amine and 21 parts of monohydrated sodium carbonate. The mixture is let stand 4 hours at room temperature and then heated for 5 hours at 85 to 95° C. The cooled reaction mixture is freed of a small amount of sodium bicarbonate by filtration. The clear filtrate contains the sodium salt of the triacetic acid derivative of ethanol amine. This solution may be used directly as a water-treating agent for the purposes described below and when so used, and especially when used as a lime sequestering agent and water softener, it should be employed in sufficient amounts to prevent undesirable precipitation.

The polycarboxylic acids and especially their water-soluble salts, such as their salts with basic reacting organic compounds, with ammonia, substituted ammonia, and alkali metals give products which are useful as detergents, detergent assistants, hard-water softening agents, lime sequestering agents, dye assistants, and water-treating agents generally for use in deterging, flocculating, deflocculating, foaming, dyeing and wetting and like processes. They are further useful in the wetting out of gray goods, as assistants in peroxide bleaching, as lime dispersing agents, for scouring rayon yarns and fabrics, wetting out of cotton goods that are to be preshrunk, scouring of lime-pulled wool, degumming, and preparation of raw stock for dyeing, as a dispersing and penetrating agent in dyeing, penetrating agent in warp sizing, in alkaline fulling, and generally in processes where detergents, detergent assistants, and water-treating agents are used with advantage.

I claim:

The process for preparing the triacetic acid derivative of ethanol amine which consists in admixing a solution containing 39 parts by weight sodium chloracetate in 56 parts by weight water with 21 parts by weight monohydrated sodium carbonate, allowing the mixture to stand for four hours at room temperature, then heating the mixture for five hours at 85 to 95° C., cooling the reaction solution, filtering off liberated sodium bicarbonate, and acidifying the filtrate to liberate a free acid of the formula $(HOOCCH_2)_2NCH_2CH_2OCH_2COOH.$

WILBER O. TEETERS.